Patented Apr. 7, 1925.

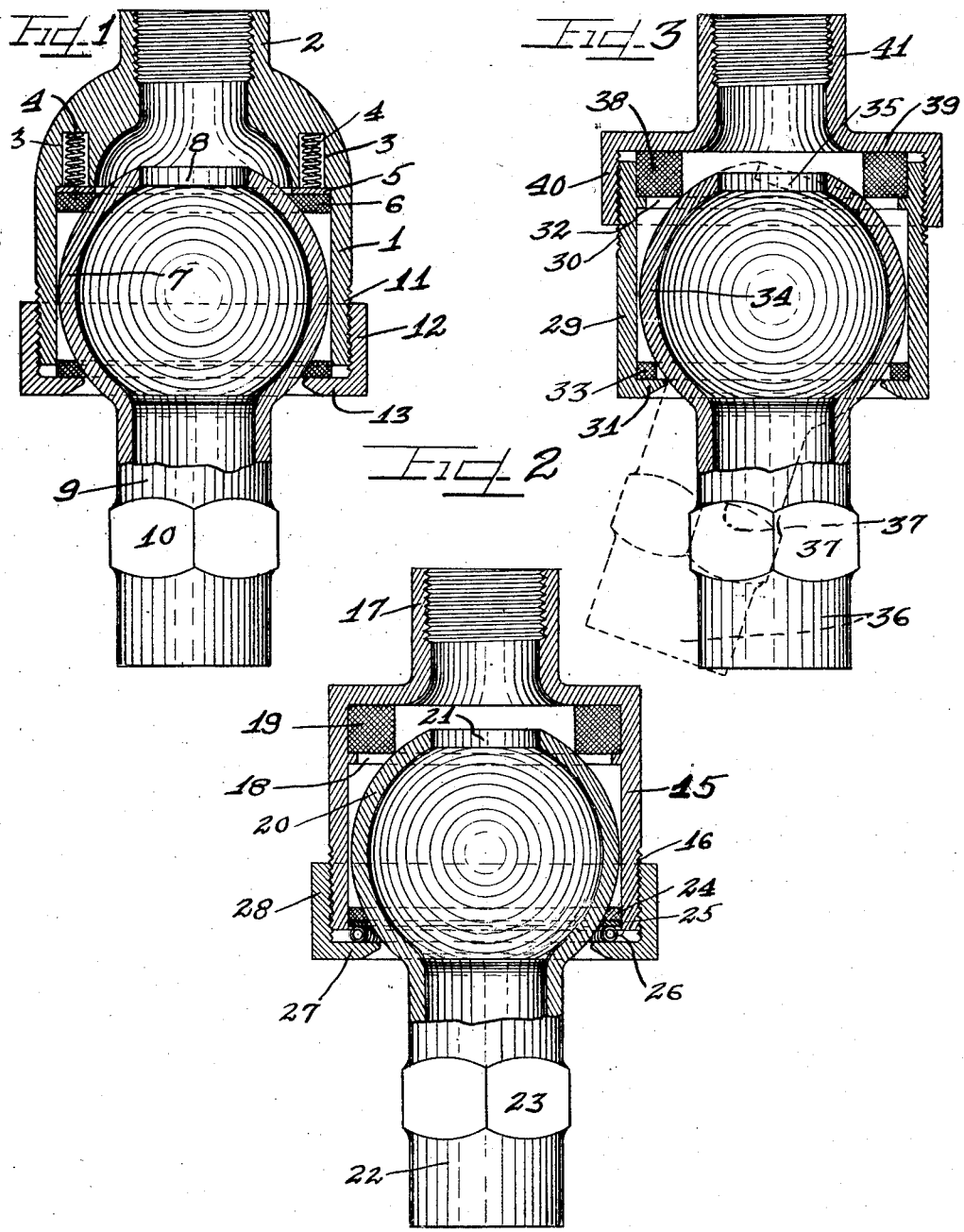

1,532,195

UNITED STATES PATENT OFFICE.

ABRAHAM L. MORRISON, OF DUBUQUE, IOWA.

SWIVEL-JOINT COUPLING.

Application filed February 4, 1922. Serial No. 534,047.

*To all whom it may concern:*

Be it known that I, ABRAHAM L. MORRISON, a citizen of the United States, and a resident of the city of Dubuque, in the county of Dubuque and State of Iowa, have invented certain new and useful Improvements in a Swivel-Joint Coupling; and I do hereby declare that the following is a full, clear, and exact description of the same, reference being had to the accompanying drawings, and to the numerals of reference marked thereon, which form a part of this specification.

This invention covers an improved type of swivel joint coupling of the ball and socket construction adapted to be readily adjusted to compensate for the wear on packing members separating the ball and socket members.

It is an object of this invention to construct swivel joint having a plurality of packing members disposed in an adjustable socket member and around a ball member.

It is also an object of the invention to provide a swivel joint coupling having resilient means therein for holding a packing in frictional engagement with a ball member.

It is an important object of this invention to provide a coupling wherein an adjustable socket member is provided with a plurality of packing members to form a double frictional contact between the socket member and a ball member swiveled therein.

Other and further important objects of this invention will be apparent from the disclosures in the specification and the accompanying drawings.

The invention (in a preferred form) is illustrated in the drawings and hereinafter more fully described.

On the drawings, Figure 1 is a central longitudinal section partly in elevation taken through a swivel joint coupling embodying the principles of this invention.

Figure 2 is a similar section of a modified form of the device.

Figure 3 is a central longitudinal section of another modification of the swivel joint coupling showing the operation in dotted lines.

As shown on the drawings, the reference numeral 1 indicates a socket open at one end and having an internally threaded neck 2 integrally formed on the other end thereof. The socket 1 has a plurality of recesses 3 therein, each of which houses a coiled spring 4. The springs 4 press against a flat washer or ring 5 disposed within the socket between the springs 4 and a packing ring 6. Projecting into the socket 1 against the packing ring 6 is a hollow ball 7 having an opening 8 therein opposite a neck 9 which is integrally formed on said ball. A nut 10 is integrally formed on the exterior of the neck 9. The open end of the socket 1 is externally threaded at 11. Threaded onto the threaded end 11 of the socket is an internally threaded collar 12 having an integral right angled flange 13 upon which a second packing ring 14 is seated and held against the ball 7 near the outer or neck end thereof.

Figure 2 illustrates a modified form of swivel joint coupling comprising a cylindrical socket 15 externally threaded at its open end at 16, and having an internally threaded neck 17 integrally formed on the other end thereof. Integrally formed within the socket 15 near the neck end thereof is a ring or flange 18 which holds a packing ring 19 in place. Projecting into the socket 15 against one edge of the inner periphery of the packing ring 19 is a hollow ball 20 having an opening 21 in the inner end thereof. Integrally formed on the ball 20 opposite the opening 21 is a neck 22 provided with an integral nut portion 23. Engaged around the ball 20 at the open end of the socket 15 is a second packing ring 24 having a flat washer or ring 25 disposed adjacent the outer surface thereof. A coiled spring 26 is engaged around the ball 20 and is held seated against the ring 25 by means of the flange 27 integrally formed at right angles on an internally threaded collar 28 which is threaded on to the threaded portion 16 of the socket 15. The ball 20 is adapted to be swiveled within the socket 15 with the two packing rings 19 and 24 in frictional engagement therewith to afford a non-leaking joint between the ball and socket. The spring 26 acts as a cushion or resilient support for holding the packing ring 24 against the ball 20.

Figure 3 illustrates another modified form of swivel joint coupling embracing a socket 29 externally threaded at 30 and having an integral inwardly directed flange 31. Integrally formed within the socket 29 near the threaded end thereof is a flange 32.

Resting on the socket flange 31 within the socket is a packing ring 33. Disposed within the socket 29 is a hollow ball 34 having an opening 35 therein. Integrally formed on the ball 34 opposite the opening 35 is a neck 36 having a nut portion 37. The ball 34 frictionally engages one of the inner peripheral edges of the packing ring 33. Seated upon the socket flange 32 and projecting out of the open end of the socket is a second packing ring 38, one of the inner peripheral edges of which is held in frictional engagement with the ball 34 by means of a cover plate 39. An internally threaded collar or flange 40 is integrally formed on the plate 39 and is threaded onto the threaded open end 30 of the socket 29 thereby compressing the packing ring 38. An internally threaded neck 41 is integrally formed on the cover plate 39.

Each of the different types of swivel joint couplings illustrated is provided with two packing rings which are positioned in an adjustable socket in frictional engagement with the outer surface of the ball member of the coupling to afford non-leaking joints between the ball and socket members. In addition to the adjustability of the socket members, which may be adjusted to compensate for the wear of the packing rings, resilient members are provided in two forms of the couplings disclosed and serve to hold one of the packing rings in resilient contact with the respective ball member. Each ball member is adapted to be swiveled within its respective socket, as illustrated in dotted lines in Figure 3.

I am aware that numerous details of construction may be varied through a wide range without departing from the principles of this invention, and I therefore do not purpose limiting the patent granted otherwise than necessitated by the prior art.

I claim as my invention:

A swivel joint coupling, comprising a socket member, a ball member therein, a packing ring contacting with the outer side of said ball member, an annular interior flange in said socket member for retaining said packing ring in position, a second packing ring contacting with the other side of said ball member at the outer end of said socket member, a flat ring member in said socket member around said ball member and contacting with said second packing ring, resilient means engaging said flat member to hold the second packing ring in frictional engagement with the ball member, and means adjustably engaged on said socket member for drawing both of the packing rings into frictional contact with the ball member.

In testimony whereof I have hereunto subscribed my name in the presence of two subscribing witnesses.

ABRAHAM L. MORRISON.

Witnesses:
  J. C. WALKER,
  L. F. KLEINE.